United States Patent
Ventura et al.

(10) Patent No.: US 10,214,704 B2
(45) Date of Patent: Feb. 26, 2019

(54) ANTI-DEGRADATION AND SELF-HEALING LUBRICATING OIL

(71) Applicants: Darryl Ventura, Houston, TX (US); Rostyslav Dolog, Houston, TX (US); Oleg A. Mazyar, Katy, TX (US); Valery Khabashesku, Houston, TX (US); Qusai Darugar, Houston, TX (US)

(72) Inventors: Darryl Ventura, Houston, TX (US); Rostyslav Dolog, Houston, TX (US); Oleg A. Mazyar, Katy, TX (US); Valery Khabashesku, Houston, TX (US); Qusai Darugar, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/480,640

(22) Filed: Apr. 6, 2017

(65) Prior Publication Data
US 2018/0291303 A1 Oct. 11, 2018

(51) Int. Cl.
*C10M 101/00* (2006.01)
*C10M 129/04* (2006.01)
(Continued)

(52) U.S. Cl.
CPC ...... *C10M 169/044* (2013.01); *C10M 101/00* (2013.01); *C10M 129/04* (2013.01);
(Continued)

(58) Field of Classification Search
CPC ............ C10M 169/044; C10M 101/00; C10M 129/04; C10M 133/04; C10M 145/40;
(Continued)

(56) References Cited

U.S. PATENT DOCUMENTS 6,228,291 B1 * 5/2001 Lee .......................... B01J 13/16
264/4.1
6,261,474 B1 * 7/2001 Egawa ................. C10M 107/24
252/67
(Continued)

FOREIGN PATENT DOCUMENTS

DE 102009031342 A1 1/2011
FR 2345618 10/1977
(Continued)

OTHER PUBLICATIONS

Chen, H., Li, Y., Gong, T., Wang, L., and Zhou, S., "Highly pH-sensitive polyurethane exhibiting shape memory and drug release", Polym. Chem., 2014, 5, 5168-5174.*
(Continued)

*Primary Examiner* — James C Goloboy
(74) *Attorney, Agent, or Firm* — Cantor Colburn LLP

(57) ABSTRACT

A lubricating oil comprises a base oil; and an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment by breaking crosslinks or hydrogen bonds in the polymeric encapsulant. The released neutralizing material can prevent the formation of viscous, high molecular weight molecules thus enhancing the lifetime of the lubricating oil and improving its reliability.

15 Claims, 3 Drawing Sheets

(51) Int. Cl.
*C10M 133/04* (2006.01)
*C10M 145/40* (2006.01)
*C10M 149/10* (2006.01)
*C10M 149/20* (2006.01)
*C10M 161/00* (2006.01)
*C10M 169/04* (2006.01)

(52) U.S. Cl.
CPC ........ *C10M 133/04* (2013.01); *C10M 145/40* (2013.01); *C10M 149/10* (2013.01); *C10M 149/20* (2013.01); *C10M 161/00* (2013.01); C10M 2203/003 (2013.01); C10M 2207/02 (2013.01); C10M 2209/12 (2013.01); C10M 2215/26 (2013.01); C10M 2217/028 (2013.01); C10M 2217/045 (2013.01); C10N 2240/10 (2013.01); C10N 2240/54 (2013.01); C10N 2250/16 (2013.01)

(58) Field of Classification Search
CPC .............. C10M 149/10; C10M 149/20; C10M 161/00; C10M 2203/003; C10M 2207/02; C10M 2209/12; C10M 2215/26; C10M 2217/028; C10M 2217/045; C10N 2240/10; C10N 2240/54; C10N 2250/16
See application file for complete search history.

(56) References Cited

U.S. PATENT DOCUMENTS

| | | | |
|---|---|---|---|
| 7,160,378 | B2 | 1/2007 | Eadie et al. |
| 7,923,421 | B2 | 4/2011 | Baum |
| 8,151,886 | B2 | 4/2012 | Xu et al. |
| 8,575,079 | B2 | 11/2013 | Hwang et al. |
| 9,506,010 | B2 | 11/2016 | Narita |
| 2006/0135374 | A1 | 6/2006 | Cooper et al. |
| 2008/0113031 | A1 | 5/2008 | Moodley et al. |
| 2010/0187925 | A1 | 7/2010 | Tingler et al. |
| 2011/0308803 | A1 | 12/2011 | O'Connell et al. |
| 2013/0146009 | A1* | 6/2013 | Pederson ............ C10M 169/04 123/1 A |
| 2013/0233546 | A1 | 9/2013 | Liang et al. |
| 2014/0087982 | A1* | 3/2014 | Calcavecchio ......... B01J 13/14 508/170 |
| 2015/0275126 | A1 | 10/2015 | Calcavecchio et al. |

FOREIGN PATENT DOCUMENTS

| | | |
|---|---|---|
| GB | 2013793 | 8/1979 |
| WO | 2006065695 A2 | 6/2006 |

OTHER PUBLICATIONS

Chen, et al. "Synthesis of pH-Responsive Chitosan Nanocapsules for the Controlled Delivery of Doxorubicin", Langmuir, 2014; 30, 4111-4119.
Kim et al. "Properties of Chitosan Films as a Function of pH and Solvent Type", Journal of Food Science E: Food Engineering and Physical Properties 71:3 (2006), pp. 119-124.
Li et al. "pH-Responsive Shape Memory Poly(ethylene glycol)-Poly(ε-caprolactone)-based Polyurethane/Cellulose Nanocrystals Nanocomposite", ACS Appl. Mater. Interfaces, 2015, 7; pp. 12988-12999.
Tripathi et al. "Characterization of Thermal Stability of Synthetic and Semi-Synthetic Engine Oils", Lubricants 2015, 3; pp. 54-79.
Yang, et al. "Triple Shape Memory Effect of Star-Shaped Polyurethane", Key Laboratory of Advanced Technologies of Materials, Ministry of Education, School of Materials Science and Engineering,Southwest Jiaotong University, Chengdu 610031, P.R. China; American Chemical Society, Applied Material Interfaces (2014); 10 pages.
International Search Report, International Application No. PCT/US2018/026240, dated Jul. 26, 2018, Korean Intellectual Property Office; International Search Report 3 pages.
International Written Opinion, International Application No. PCT/US2018/026240, dated Jul. 26, 2018, Korean Intellectual Property Office; International Written Opinion 9 pages.

* cited by examiner

ANTI-DEGRADATION AND SELF-HEALING LUBRICATING OIL

BACKGROUND

The disclosure relates to lubricating oils, particularly lubricating oils having anti-degradation and/or self-healing characteristics.

Lubricating oils are used for a variety of applications, including providing lubrication for engines, motors, bearings, and other metal surfaces. Lubricating oils can also reduce wear on moving parts, clean moving parts from the sludge, inhibit corrosion, improve sealing, and reduce the operating temperature by carrying away the heat generated within the engine or moving parts. Lubricating oils ensure proper functionality and can prolong the longevity of vehicles and other motorized equipment such as ESP pumps.

Lubricants, however, are susceptible to thermal and oxidative degradation at elevated temperatures and pressures. When used in an abusive environment for an extended period of time, viscous, higher molecular weight molecules can form thus degrading the lubricity of the lubricating oil. Hence, it is desirable to provide lubricating oils having anti-degradation or self-healing characteristics.

BRIEF DESCRIPTION

In an embodiment, a lubricating oil comprises a base oil; and an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

A method of reducing degradation of a lubricating oil comprises: adding to a base oil an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

In another embodiment, an engine lubricating system comprises: a circulation system for providing a continuing flow of a lubricating oil to an internal combustion engine; and a lubricating oil disposed within the circulation system, the lubricating oil comprising a base oil; and an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

In still another embodiment, an electric motor comprises a rotatable shaft; a stator; a rotor disposed within the stator and spaced from the stator by a running clearance therebetween, the rotor configured for rotation of the shaft, and a lubricating oil as disclosed above disposed in the running clearance.

BRIEF DESCRIPTION OF THE DRAWINGS

The following descriptions should not be considered limiting in any way. With reference to the accompanying drawings, like elements are numbered alike.

DETAILED DESCRIPTION

The inventors hereof have found that an anti-degradation additive comprising microcapsules, nanocapsules, or a combination thereof imparts anti-degradation and/or self-healing characteristics to lubricating oils. The microcapsules and the nanocapsules each independently have a core of a neutralizing material and a polymeric encapsulant configured to release the neutralizing material in an acidic environment. Without wishing to be bound by theory, it is believed that conventional lubricating oils can undergo oxidative degradation generating byproducts such as carboxylic acids. Carboxylic acids in turn can oligomerize or polymerize and form viscous, high molecular weight molecules thus degrade the lubricity of lubricating oils. By including the microcapsules and/or nanocapsules as disclosed herein in a conventional lubricating oil, when carboxylic acid byproducts are generated, the polymeric encapsulant responds to the acidic environment and releases the neutralizing material. The released neutralizing material reacts with the carboxylic acid byproducts and prevent them from forming viscous, high molecular weight molecules thus enhancing the lifetimes of the lubricating oils and improving their reliability.

The neutralizing material in the core of the anti-degradation additive is a $C_{1-30}$ amine, a $C_{1-30}$ alcohol, or a combination comprising at least one of the foregoing. Preferably, the neutralizing material is a $C_{10-20}$ amine, a $C_{15-20}$ amine, a $C_{10-20}$ alcohol, or a $C_{15-20}$ alcohol. As used herein, amines include primary amines, secondary amines, or tertiary amines. Primary amines such as octadecylamine are specifically mentioned.

The neutralizing material is encapsulated by a polymeric encapsulant so that it is not prematurely consumed. The polymeric encapsulant is pH sensitive, and is configured to release the neutralizing material in an acidic environment by breaking crosslinks and/or hydrogen bonds between the polymer chains of the polymeric encapsulant. In an embodiment, the polymeric encapsulant comprises a chitosan having acid-labile crosslinks, a pyridine-containing polyurethane, a pyridine-containing polyurea, or a combination comprising at least one of the foregoing.

Chitosan is a biopolymer composed of N-acetylglucosamine and glucosamine units. Chitosan can be functionalized to incorporate various functional groups. Exemplary functional groups include carboxylic acids, alkenyl groups, alkyl groups, carbonyl groups, and the like. Acid-labile crosslinks can be formed between amine or hydroxyl groups on the chitosan or via other functional groups introduced onto chitosan. Exemplary acid-labile crosslinks of chitosan include beta thiopropionate, glutaraldehyde, epichlorohydrin, or a combination comprising at least one of the foregoing. Methods to prepare a chitosan having acid-labile groups are illustrated in Langmuir 2014, 30, 4111-4119.

Figure 1:
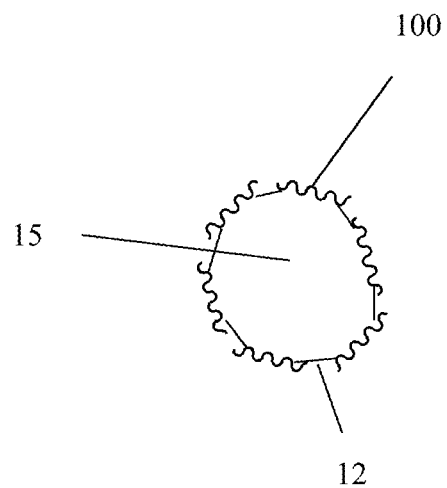
FIG. 1 illustrates an exemplary micro/nano-capsule having a core of a neutralizing material and a polymeric encapsulant according to an embodiment of the disclosure.
Figure 2:
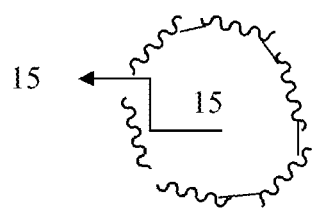
FIG. 2 illustrates the release of the neutralizing material of FIG. 1 from the polymeric encapsulant.

FIG. 1 illustrates an exemplary micro/nano-capsule having a core of a neutralizing material 15 and a polymeric encapsulant according to an embodiment of the disclosure. The polymeric encapsulant can include a chitosan based polymer chain 100 and acid-labile crosslinks 12 between the chitosan based polymer chains. As shown in FIG. 2, when the lubricating oil starts to degrade and generate a carboxylic acid byproduct, the acidic byproduct can break crosslinks 12 thus releasing the neutralizing material 15 from the capsules.

Figure 3:
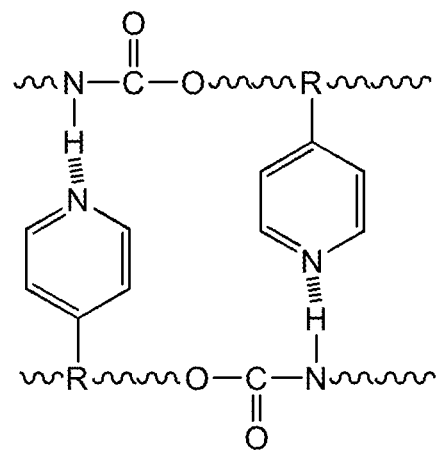
FIG. 3 illustrates an exemplary structure of a pyridine-containing polyurethane encapsulant under neutral or a basic conditions.
Figure 4:
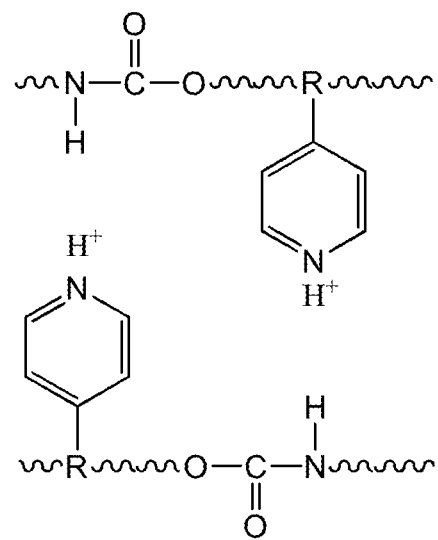
FIG. 4 illustrates an exemplary structure of a pyridine-containing polyurethane encapsulant under acidic conditions.

Pyridine-containing polyurethanes and pyridine-containing polyureas refer to polyurethanes and polyureas having a pyridine moiety incorporated into the backbone of the polymers. Advantageously, under neutral or basic conditions, hydrogen bonding is formed between the nitrogen atom of a pyridine and the H atom of a H—N-moiety on the backbone of a polyurethane or polyurea as shown in FIG. 3. Under acidic conditions, the nitrogen atom of the pyridine is protonated and the hydrogen bonds are broken as shown in FIG. 4. Without wishing to be bound by theory, it is believed that when the hydrogen bonds break, the capsules become weak, and due to mechanical shear such as internal friction, the capsules are broken releasing the neutralizing material.

Polyurethanes are formed from a polyol and a polyisocyanate. A pyridine moiety can be incorporated into the backbone of a polyurethane via a polyol or a polyisocyanate monomer, oligomer, or pre-polymer. A pyridine moiety can also be incorporated into the backbone of a polyurethane via a chain extender. Methods to prepare a pyridine-containing polyurethane are illustrated in Polym. Chem., 2014, 5, 5168-5174. A pyridine moiety can be incorporated into the backbone of a polyurea via the monomers or oligomers used to prepare the polymer.

The micro- or nano-sized capsules may have different sizes, shapes and surface morphology. The shapes include spherical, tubular, or the like. The micro- or nano-sized capsules can also be amorphous. The particles can have an average particle size of about 1 nm to about 500 microns, or about 5 nm to about 250 microns, or about 100 nm to about 100 microns. As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. For the particles having a core/shell structure, the thickness of the shell is about to about 5 nm to about 100 nm or about 10 nm to about 50 nm or about 5 nm to about 15 nm.

In an embodiment, the anti-degradation additive includes nanocapsules having an average particle size of less than or equal to about 500 nm, specifically about 1 to about 500 nm, or about 5 to about 400 nm, more specifically about 10 to about 300 nm, and even more specifically about 10 to about 250 nm. Nanocapsules having a size as disclosed herein can have a less tendency to interfere with the viscosity of the lubricating oil.

The micro- or nano-sized capsules are produced by various synthesis approaches like sol-gel, reverse micelle, or the like. In an exemplary method, the polymeric encapsulant is mixed with the neutralizing agent under sonication to form microcapsules or nanocapsules. The formed microcapsules or nanocapsules can be isolated before incorporated into a lubricating oil.

The anti-degradation additive may be present in an amount up to about 30% by volume of the lubricating oil. Alternatively, the anti-degradation additive may be present in an amount up to about 20% by volume. In other embodiments, the anti-degradation additive may be present in an amount up to about 10% by volume. In certain embodiments, the anti-degradation additive may be present in an amount between about 0.001 and about 30% by volume, preferably between about 0.01 and about 20% by volume, or about 0.01 to about 15% by volume, each based on the total volume of the lubricating oil.

Suitable base oils for the lubricant are hydrocarbon based and may be natural oils or synthetic oils. As used herein, natural oil refers to a naturally occurring liquid containing a mixture of hydrocarbons having various molecular weights, which has been recovered from a subsurface rock formation, and may have been subjected to a refining process. As used herein, synthetic oil refers to a hydrocarbon liquid that consists of chemical compounds not originally present in crude oil, but were instead artificially synthesized from other compounds.

The base oil may be any natural oil, including various petroleum distillates, or synthetic oil in any rheological form, including liquid oil, grease, gel, oil-soluble polymer composition or the like, particularly the mineral base stocks or synthetic base stocks used in the lubrication industry, e.g., Group I (solvent refined mineral oils), Group II (hydrocracked mineral oils), Group III (severely hydrocracked oils, sometimes described as synthetic or semi-synthetic oils), Group IV (polyalphaolefins (PAOs)), and Group V (esters, naphthenes, and others). Examples include polyalphaolefins, synthetic esters, and polyalkylglycols.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-octenes), poly(1-decenes), etc., and mixtures thereof); alkylbenzenes (e.g., dodecylbenzenes, tetradecylbenzenes, dinonylbenzenes, di-(2-ethylhexyl), benzenes, etc.); polyphenyls (e.g., biphenyls, terphenyls, alkylated polyphenyls, etc.), alkylated diphenyl, ethers and alkylated diphenyl sulfides and the derivatives, analogs and homologs thereof and the like. Alkylene oxide polymers and interpolymers and derivatives thereof where the terminal hydroxyl groups have been modified by esterification, etherification, etc. constitute another class of known synthetic oils.

Another suitable class of synthetic oils comprises the esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol diethylene glycol monoether, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

The base oil can be present in a lubricating oil in an amount of greater than about 60 percent by volume, greater than about 70 percent by volume, or greater than about 80 percent by volume, based on the total volume of the lubricating oil.

The lubricating oil can optionally include additional chemical compounds, including but not limited to, anti-oxidants, detergents, friction modifiers, viscosity modifiers, corrosion inhibiting additives, anti-wear additives, anti-foam agents, surfactants, conditioners, and dispersants.

The lubricating oils disclosed herein have improved anti-degradation and self-healing properties. The lubricating oil has a dynamic viscosity of about 1 cP to about 2000 cP at 23° C. In an embodiment, the lubricating oil has a less viscosity increase as compared to an otherwise identical lubricating oil excepting for being free of the anti-degradation additive. In another embodiment, the lubricating oil has a longer lifetime as compared to an otherwise identical lubricating oil excepting for being free of the anti-degradation additive. The lubricating oils can be used in various applications. In some embodiments, the lubricating oils of the disclosure are useful in automotive, marine, aviation, and industrial engine and machine components. As used herein, lubricating oils include motor oils.

Figure 5:
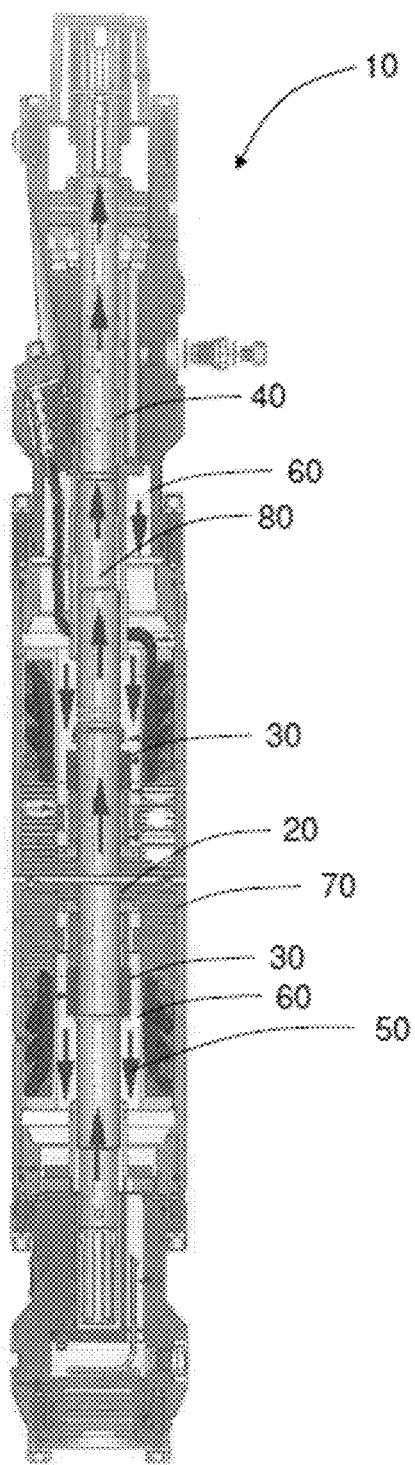
FIG. 5 is a cross-sectional view of an exemplary embodiment of a downhole, submersible pump configured to use a lubricating oil composition as disclosed herein.

In one embodiment, a lubricating oil as described herein, is used in a downhole electrical submersible pumping system (ESP) that is disposed in a wellbore, wherein the wellbore may intersect a subterranean formation. As show in FIG. 5, the ESP includes on a lower end a motor 10, a seal (not shown), and a pump (not shown) on an upper end. The motor 10 and pump are separated by the seal. The motor includes a rotor 20, or a plurality of rotors 20, and bearings 30 mounted on a motor shaft 40, wherein the shaft is coupled to and drives the pump. The motor shaft is coupled to the pump via a seal section, and the motor shaft 40 is coupled to a shaft in the seal section, which in turn is coupled to a shaft in the pump. The rotor 20 can be a hollow cylinder made of a stack of laminations, a copper bar and end rings, which is supported at each end by the bearings 30. The motor 10 is filled with a lubricating oil 50 having a composition as described herein and includes a running clearance 60 located between the internal diameter of the stator 70 and outside diameter of the rotors 20 wherein the oil 50 provides lubrication for the bearings 30 and carries away heat generated by friction and rotor 20 and windage losses and acts as an electrical insulator between the stator 70 and the rotor 20. The oil within the running clearance 60 can be circulated within the motor 10 through a hole 80 in the shaft 40. The oil 50 in the motor is also used in the seal, and communicates and circulates between the seal and motor 10.

In an alternate embodiment of the disclosure, a method of lubricating an electric submersible pump assembly disposable within a wellbore is provided. The assembly includes a motor, wherein the motor includes a plurality of rotors and bearings mounted on a shaft, a stator external to the plurality of rotors, and a running clearance between an internal diameter of the stator and an external diameter of the rotor. The motor is coupled to a pump via a seal section, and the motor shaft is coupled to a shaft in the seal section, which in turn is coupled to a shaft in the pump. The method includes the step of mixing an anti-degradation additive, such as those described herein, into a base oil, then dispensing the lubricating oil into motor and the seal section.

An engine lubricating system for an internal combustion engine is also provided. The engine lubricating system comprises a circulation system for providing a continuing flow of a lubricating oil to the internal combustion engine and engine components; and a lubricating oil disposed within the circulation system. The lubricating oil comprises a base oil and an anti-degradation additive as disclosed herein.

Set forth are various embodiments of the disclosure.

Embodiment 1

A lubricating oil comprising: a base oil; and an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

Embodiment 2

The lubricating oil of Embodiment 1, wherein the neutralizing material comprises a $C_{1-30}$ amine, a $C_{1-30}$ alcohol, or a combination comprising at least one of the foregoing.

Embodiment 3

The lubricating oil of Embodiment 1 or Embodiment 2, wherein the neutralizing material comprises a $C_{10-20}$ amine, a $C_{10-20}$ alcohol, or a combination comprising at least one of the foregoing Embodiment 4

The lubricating oil of any one of Embodiments 1 to 4, wherein the polymeric encapsulant comprises a chitosan having acid-labile crosslinks, a pyridine-containing polyurethane, a pyridine-containing polyurea, or a combination comprising at least one of the foregoing.

Embodiment 5

The lubricating oil of Embodiment 4, wherein the acid-labile crosslinks comprise beta thiopropionate, glutaraldehyde, epichlorohydrin, or a combination comprising at least one of the foregoing.

Embodiment 6

The lubricating oil of any one of Embodiments 1 to 5, comprising up to about 30 volume percent of the anti-degradation additive.

Embodiment 7

The lubricating oil of any one of Embodiments 1 to 6, wherein the anti-degradation additive comprises nanocapsules having an average particle size of about 1 nm to about 500 nm.

Embodiment 8

The lubricating oil of any one of Embodiments 1 to 7, wherein the lubricating oil has a dynamic viscosity of about 1 cP to about 2,000 cP at 23° C.

Embodiment 9

A method of reducing degradation of a lubricating oil, the method comprising: adding to a base oil an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

Embodiment 10

The method of Embodiment 9, wherein the polymeric encapsulant comprises a chitosan having acid-labile crosslinks, a pyridine-containing polyurethane, a pyridine-containing polyurea, or a combination comprising at least one of the foregoing.

Embodiment 11

The method of Embodiment 10, further comprising: breaking the acid-labile crosslinks of the chitosan; and releasing the neutralizing material from the polymeric encapsulant comprising the chitosan having acid-labile crosslinks.

Embodiment 12

The method of Embodiment 11, wherein the acid-labile crosslinks comprise beta thiopropionate, glutaraldehyde, epichlorhydrin, or a combination comprising at least one of the foregoing.

Embodiment 13

The method of Embodiment 10, further comprising: breaking a hydrogen bond between the nitrogen atom of a pyridine and the H atom of a H—N-moiety on the polyurethane; and releasing the neutralizing material from the polymeric encapsulant comprising the pyridine-containing polyurethane.

Embodiment 14

The method of any one of Embodiments 9 to 13, further comprising neutralizing an acidic byproduct generated from the lubricating oil during use with the neutralizing material released from the polymeric encapsulant.

Embodiment 15

The method of any one of Embodiments 9 to 14, wherein the neutralizing material comprises a $C_{1-30}$ amine, a $C_{1-30}$ alcohol, or a combination comprising at least one of the foregoing.

Embodiment 16

The method of any one of Embodiments 9 to 15, wherein the neutralizing material comprises a $C_{10-20}$ amine, a $C_{10-20}$ alcohol, or a combination comprising at least one of the foregoing

Embodiment 17

The method of any one of Embodiments 9 to 16, wherein the lubricating oil comprises up to about 30 volume percent of the anti-degradation additive.

Embodiment 18

An engine lubricating system comprising: a circulation system for providing a continuing flow of a lubricating oil to an internal combustion engine; and a lubricating oil disposed within the circulation system, the lubricating oil comprising a base oil; and an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

Embodiment 19

The engine lubricating system of Embodiment 18, wherein the lubricating oil is in accordance with any one of Embodiments 1 to 8.

Embodiment 20

An electric motor, comprising: a rotatable shaft; a stator; a rotor disposed within the stator and spaced from the stator by a running clearance herebetween, the rotor configured for rotation of the shaft; and a lubricating oil disposed in the running clearance, the lubricating oil comprising a base oil an anti-degradation additive comprising microcapsules, nanocapsules, or a combination comprising at least one of the foregoing; the microcapsules and the nanocapsules each independently having a core of a neutralizing material and a polymeric encapsulant configured to release the neutralizing material in an acidic environment.

Embodiment 21

The electric motor of Embodiment 20, wherein the lubricating oil is in accordance with any one of Embodiments 1 to 8.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety. The wellbore can be vertical, deviated or horizontal.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

The invention claimed is:
1. A lubricating oil comprising:
a base oil; and
an anti-degradation additive comprising nanocapsules having an average particle size of about 1 nm to about 500 nm;

the nanocapsules having a core of a neutralizing material and a polymeric encapsulant configured to release the neutralizing material in an acidic environment, the encapsulate comprising a pyridine-containing polyurethane, a pyridine-containing polyurea, or a combination comprising at least one of the foregoing, and the neutralizing material comprising a $C_{10-20}$ amine, a $C_{10-20}$ alcohol, or a combination comprising at least one of the foregoing.

2. The lubricating oil of claim 1, comprising up to about 30 volume percent of the anti-degradation additive.

3. The lubricating oil of claim 1, wherein the anti-degradation additive comprises nanocapsules having an average particle size of about 10 nm to 250 nm.

4. The lubricating oil of claim 1, wherein the lubricating oil has a dynamic viscosity of about 1 cP to about 2,000 cP at 23° C.

5. A method of reducing degradation of a lubricating oil in a downhole environment, the method comprising:

adding to a base oil an anti-degradation additive comprising nanocapsules having an average particle size of about 1 nm to about 500 nm;

the nanocapsules having a core of a neutralizing material and a polymeric encapsulant configured to release the neutralizing material in an acidic environment, the polymeric encapsulant comprising a pyridine-containing polyurethane, a pyridine-containing polyurea, or a combination comprising at least one of the foregoing, and the neutralizing material comprising a $C_{10-20}$ amine, a $C_{10-20}$ alcohol, or a combination comprising at least one of the foregoing.

6. The method of claim 5, wherein the polymeric encapsulant comprises the pyridine-containing polyurethane, and the method further comprises:

breaking a hydrogen bond between the nitrogen atom of a pyridine and the H atom of a H—N— moiety on the polyurethane; and releasing the neutralizing material from the polymeric encapsulant comprising the pyridine-containing polyurethane.

7. The method of claim 5, further comprising neutralizing an acidic byproduct generated from the lubricating oil during use with the neutralizing material released from the polymeric encapsulant.

8. The method of claim 5, wherein the lubricating oil comprises up to about 30 volume percent of the anti-degradation additive, based on the total volume of the lubricating oil.

9. An engine lubricating system comprising:

a circulation system for providing a continuing flow of a lubricating oil to an internal combustion engine; and a lubricating oil disposed within the circulation system, the lubricating oil comprising a base oil; and an anti-degradation additive comprising nanocapsules having an average particle size of about 1 nm to about 500 nm;

the nanocapsules having a core of a neutralizing material and a polymeric encapsulant configured to release the neutralizing material in an acidic environment, the polymeric encapsulant comprising a pyridine-containing polyurethane, a pyridine-containing polyurea, or a combination comprising at least one of the foregoing, and the neutralizing material comprising a $C_{10-20}$ amine, a $C_{10-20}$ alcohol, or a combination comprising at least one of the foregoing.

10. An electric motor, comprising:

a rotatable shaft;

a stator;

a rotor disposed within the stator and spaced from the stator by a running clearance therebetween, the rotor configured for rotation of the shaft; and a lubricating oil disposed in the running clearance, the lubricating oil comprising a base oil an anti-degradation additive comprising nanocapsules having an average particle size of about 1 nm to about 500 nm;

the nanocapsules having a core of a neutralizing material and a polymeric encapsulant configured to release the neutralizing material in an acidic environment, wherein the neutralizing material comprises a $C_{10-20}$ amine, a $C_{10-20}$ alcohol, or a combination comprising at least one of the foregoing, and the polymeric encapsulant comprises a pyridine-containing polyurethane, a pyridine-containing polyurea, or a combination comprising at least one of the foregoing.

11. The lubricating oil of claim 1, wherein the nanocapsules have a core/shell structure, and a thickness of the shell is about 10 nm to about 50 nm.

12. The lubricating oil of claim 1, wherein the thickness of the shell is about 5 nm to about 15 nm.

13. The lubricating oil of claim 1, wherein the polymeric encapsulant comprises a pyridine-containing polyurethane.

14. The lubricating oil of claim 1, wherein the polymeric encapsulant comprises a pyridine-containing polyurea.

15. The lubricating oil of claim 1, comprising about 0.01 to about 15 volume percent of the anti-degradation additive, based on the total volume of the lubricating oil.

* * * * *